UNITED STATES PATENT OFFICE.

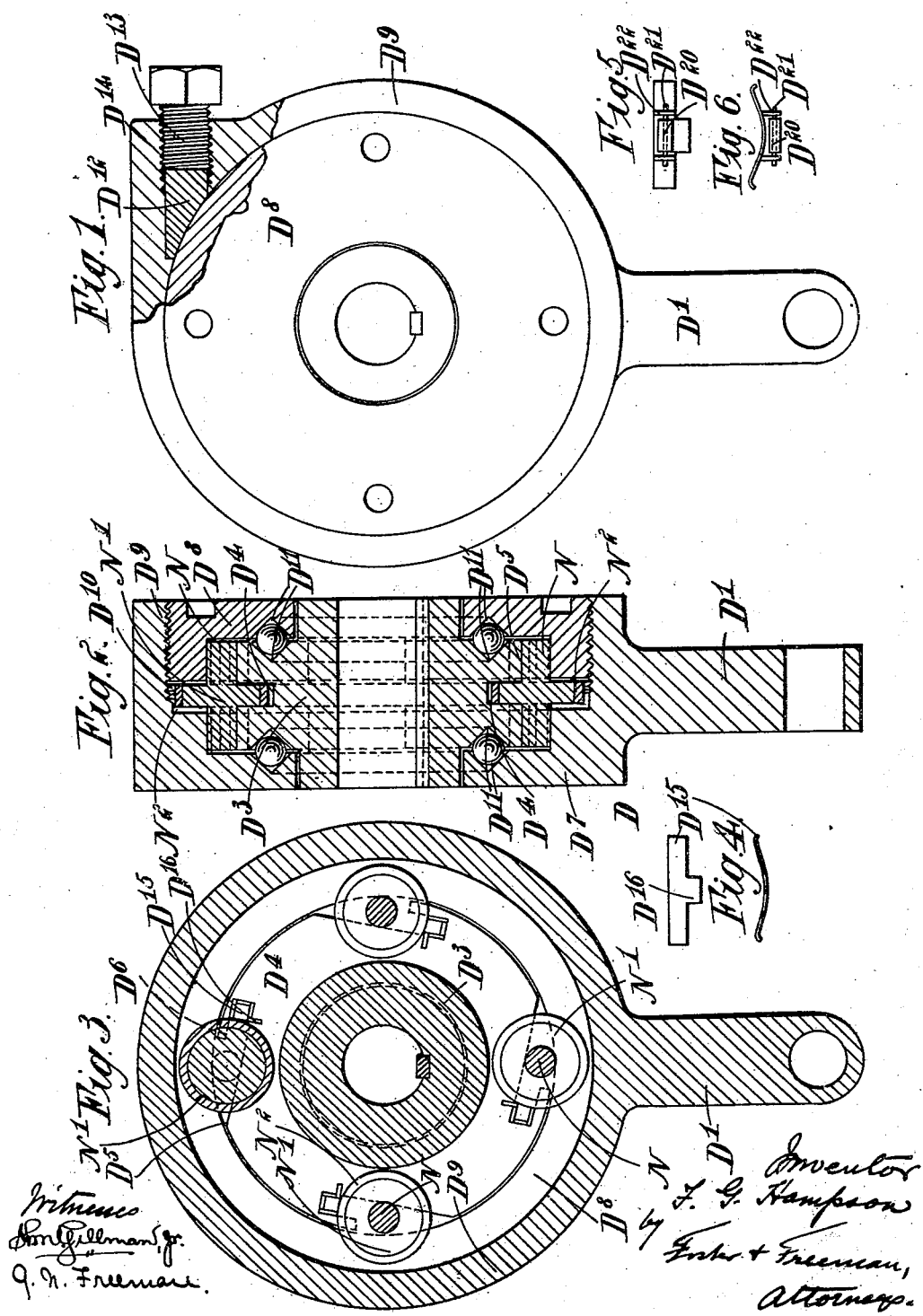

FRANK GEORGE HAMPSON, OF LONDON, ENGLAND.

FRICTION-CLUTCH.

SPECIFICATION forming part of Letters Patent No. 694,270, dated February 25, 1902.

Application filed July 28, 1900. Serial No. 25,192. (No model.)

*To all whom it may concern:*

Be it known that I, FRANK GEORGE HAMPSON, a subject of the Queen of England, residing at London, England, have invented certain new and useful Improvements in Friction-Clutches, (for which application has been made in Great Britain under No. 107, dated January 2, 1900,) of which the following is a specification.

This invention relates to friction-clutches, its object being to improve the construction and arrangement of parts whereby the clutch is rendered more efficient and certain in its operation and its life is prolonged.

The invention will be fully described hereinafter, reference being had to the accompanying drawings, in which—

Figure 1 is an elevation, partly broken away and partly in section, of my improved clutch; Figs. 2 and 3, sections taken at a right angle to each other. Fig. 4 is a detached view of one of the springs used therein. Figs. 5 and 6 show an alternative construction of spring.

Like letters indicate like parts in all figures.

$D^3$ is a disk-like body adapted to be keyed or otherwise secured to a shaft or spindle. The body $D^3$ is provided with a central circumferential slot $D^4$, and its circumference is cut away at a plurality of points (four, as shown in Fig. 3, being a suitable number) to form inclined bearing-surfaces $D^5$ for the rollers N. At the lower end of each of these bearing-surfaces is formed a slot $D^6$. The rollers N are formed with or have fixed onto them a central collar N' of a width to form an accurate but easy working fit in the slot $D^4$ of the clutch-body. The casing, which is capable of movement on the clutch-body, is formed in two parts $D^7 D^8$, the part $D^7$, which carries the working arm D', covering one side and half of the circumference of the body. The other part $D^8$ covers the rest of the body, and its outer edge screws into an internally-threaded flange-like portion $D^9$ of the part $D^7$ in such a manner as to leave an annular slot $D^{10}$, corresponding to the slot $D^4$, before described, to receive the roller-collars N', but wider than the latter, so as not to engage with the sides of the collars. Preferably ball-bearings are employed between the casing and the clutch-body, as shown in Fig. 2, the races for the balls being formed by annular grooves $D^{11}$ in the sides of the body $D^3$ and the casing $D^7 D^8$. The bearing is adjustable by altering the relative position of the parts $D^7 D^8$, and to lock these parts together a locking nut and piece $D^{13} D^{12}$ are provided in an offset $D^{14}$ of the casing $D^7$. Springs $D^{15}$ are employed in the usual manner to hold the rollers in position. Preferably they are constructed, as shown, with a central offset $D^{16}$, which fits in the slot $D^4$, the springs themselves being placed in the slots $D^6$, thus insuring a central pressure on the rollers and preventing the possibility of the springs shifting when once placed in position. The springs may bear against the collars direct. Preferably the collars are provided with rings $N^2$, with which the springs engage, in order to minimize the action of the springs in hindering rotation of the rollers, or the springs themselves may have rollers mounted on them at the bearing-point, as shown in Figs. 5 and 6, in which the spring $D^{16}$ is shown with a roller $D^{20}$, mounted on a pin $D^{21}$, carried on lugs $D^{22}$.

By the construction and arrangement above described the position of the rollers at a right angle to the plane of movement of the clutch is maintained and insured, an important point as regards both the efficient working of the clutch and its length of life.

What I claim as my invention, and desire to secure by Letters Patent, is—

1. In a friction-clutch, the combination with roller friction-pieces each provided with a collar, of a body having inclined bearing-surfaces for the rollers, and a casing capable of movement on the body, the body and the casing being each provided with a slot to receive the collars, substantially as and for the purpose specified.

2. In a friction-clutch and in combination, a body having a plurality of inclined bearing-surfaces and a circumferential slot, a roller friction-piece on each bearing-surface having a collar engaged in said slot, a spring engaging each of said collars, a casing, capable of movement on said body, formed of two members, and the sides of said body and said casing members having grooves forming ball-races, balls in said races, the one member of the casing being adjustably connected with the other member to adjust the ball-bearings, substantially as specified.

3. In a friction-clutch, a body having an inclined bearing-surface, and a circumferential slot, combined with a casing having a slot opposing the slot in the body, a roller friction-piece on said bearing-surface having a collar extending into said slots, a spring extending transversely of and bearing against the collar, said spring having an offset projecting into the slot in said body, substantially at set forth.

4. In a friction-clutch, a body having an inclined bearing-surface and a circumferential slot, combined with a casing having a slot opposing that in the body, a roller friction-piece on said bearing-surface, having a collar extending into said slots, a ring on said collar, and a spring engaging said ring, substantially as set forth.

5. In a friction-clutch, a body having an inclined bearing-surface, a circumferential slot, and a transverse slot $D^6$, combined with a casing having a slot opposing the circumferential slot in the body, a roller friction-piece on said bearing-surface having a collar extending in said opposing slots, and a spring supported in said slot $D^6$, and bearing against said collar, substantially as set forth.

6. In a friction-clutch, a body having an inclined bearing-surface, a circumferential slot, and a transverse slot $D^6$, combined with a casing having a slot opposing the circumferential slot in the body, a roller friction-piece on said bearing-surface having a collar extending in said opposing slots, a spring supported in said slot $D^6$, and a roller carried by said spring, and bearing against said collar, substantially as set forth.

In testimony whereof I have signed my name to this specification in the presence of two subscribing witnesses.

FRANK GEORGE HAMPSON.

Witnesses:
 HAROLD WADE,
 HARRY B. BRIDGE.